United States Patent [19]

Aarts

[11] Patent Number: 4,689,987
[45] Date of Patent: Sep. 1, 1987

[54] LEAKAGE DETECTION WITH FLEXIBLE BAG

[75] Inventor: Mathias L. C. Aarts, Bilthoven, Netherlands

[73] Assignee: Product Suppliers AG, Zug, Switzerland

[21] Appl. No.: 886,522

[22] Filed: Jul. 16, 1986

[30] Foreign Application Priority Data

Jul. 17, 1985 [NL] Netherlands .......................... 8502062

[51] Int. Cl.[4] .............................................. G01M 3/32
[52] U.S. Cl. ..................................................... 73/49.3
[58] Field of Search ................. 73/49.3, 49.2, 52, 40.7

[56] References Cited

U.S. PATENT DOCUMENTS

| | | | |
|---|---|---|---|
| 3,027,753 | 4/1962 | Harder, Jr. ....................... | 73/49.3 X |
| 4,055,984 | 11/1977 | Marx ................................ | 73/49.2 X |
| 4,593,554 | 6/1986 | Aarts ................................ | 73/49.3 |

FOREIGN PATENT DOCUMENTS 1209569  9/1959  France ................................ 73/49.3

Primary Examiner—Stewart J. Levy
Assistant Examiner—Joseph W. Roskos
Attorney, Agent, or Firm—Scully, Scott, Murphy & Presser

[57] ABSTRACT

A bag for use in leak testing vacuum packages, by placing a vacuum package in a bag of elastic flexible foil, providing a pressure differential between the outside and the inside of the bag, and monitoring the pressure variation in the space between the outside of the package and the inside of the flexible bag. According to the invention, the bag is double-walled with the inner and outer walls merging into each other at the open end of the bag, is provided with a dimensionally stable frame between the walls of the bag, and is further provided with an inlet for admitting compressed air into the space between the walls of the bag.

5 Claims, 1 Drawing Figure

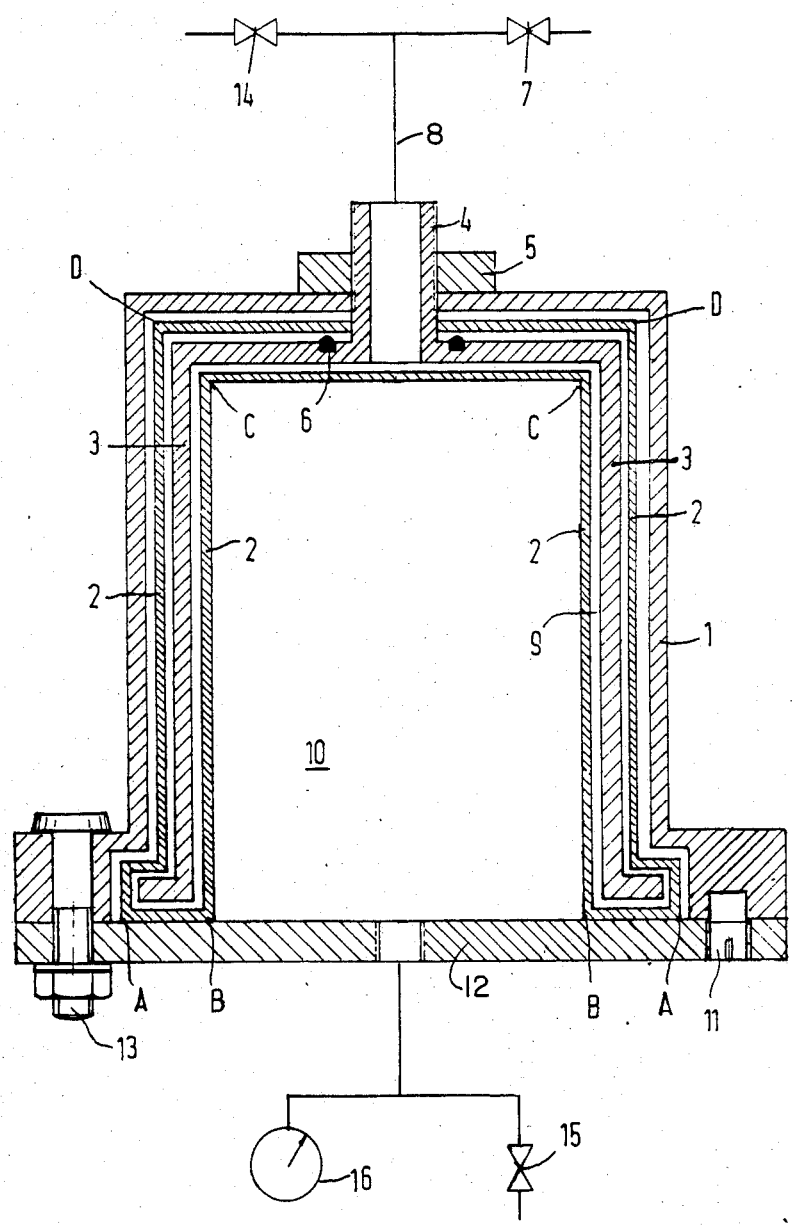

LEAKAGE DETECTION WITH FLEXIBLE BAG

BACKGROUND OF THE INVENTION

In our European patent application No. 85.200.130.4, corresponding to U.S. Pat. No. 4,593,554, there is described a method of rapidly showing any leakage in vacuum packages. According to a preferred embodiment of that application, a flexible bell is placed within a rigid bell. The vacuum package is placed in the flexible bell, which consists of flexible, elastic foil, whereafter a pressure differential is provided between, on the one hand, the space between the vacuum package and the flexible bell and, on the other, the space between the rigid bell and the flexible bell, to cause the foil of the flexible bell to fit closely around the vacuum package.

The pressure in the small space remaining between the vacuum package and the flexible bell is kept higher than the pressure in the vacuum package. In the event of a leakage, air will pass from the small remaining space into the vacuum package. As a consequence the pressure in this small space will decrease. This decrease can be measured in a highly sensitive manner.

The preferred embodiment referred to above is shown in FIG. 3 of the above European application and is a (e.g. rubber) bag having substantially the same shape as the vacuum package to be tested.

SUMMARY OF THE INVENTION

It is an object of the present invention to provide a considerable simplification in the leak testing method and apparatus by means of a particular construction of the bag.

According to the present invention, there is provided a bag for use in leak testing vacuum packages by the method disclosed in European patent application No. 85.200.130.4, which comprises placing a vacuum package in a bag of elastic flexible foil, which bag is open at one end for the introduction of the vacuum packages and for the rest is of substantially the same shape as the package to be tested, subsequently, by providing a pressure differential between the outside and the inside of the bag, causing the same to conform to the contours of the package, and finally monitoring the pressure variation in the space remaining, after such conforming, between the package and the flexible bag, said bag being characterized by
- being double-walled with the space between the inner and outer walls of the bag being closed at the open end of the bag owing to the inner and outer walls merging into each other at that point;
- being provided with a dimensionally stable frame between the walls of the bag, of substantially the same shape as the bag; and
- being provided with an inlet for admitting compressed air into the space between the walls of the bag.

BRIEF DESCRIPTION OF THE DRAWINGS

The sole FIGURE in the drawing is a cross-sectional view through a leak testing apparatus including a bag according to a preferred embodiment of the invention.

DETAILED DESCRIPTION OF THE PREFERRED EMBODIMENTS

The invention will be described with reference to the accompanying drawing, it being assumed that the vacuum package is introduced "from below", that is to say that the rigid bell and the bag are "upside down". The rigid bell (e.g. of metal) is shown at 1. The bag, indicated at 2, has such a shape that a double wall is formed, between which is disposed a rigid frame 3 having substantially the shape of the package to be tested. A portion 4 of frame 3 is, for example, formed as a tube with external screwthread. By means of a nut 5, a rigid connection can be formed between the rigid bell 1 and frame 3. For greater security, an O-ring 6 may be provided between the bottom of bag 2 and the bottom of frame 3, which at this point may be provided with a groove for receiving the O-ring.

The testing procedure is as follows. To simplify the introduction of the vacuum package, a partial vacuum can be generated in space 9 between the double wall of bag 2 by opening valve 7 and through channel 8. As a consequence, the foil of bag 2 will bed down onto the inner wall of frame 3. This means that space 10 is slightly enlarged to permit the easy introduction of the vacuum package (not shown). Bell 1 is provided with a lug 11. Cover 12 pivots about a pivot 13, which is also fast to bell 1. Cover 12 is formed with a short slot at its edge which when cover 12 is pivoted about pivot 13 receives lug 11. The rigid bell is now closed. By means of valve 14, a superatmospheric pressure is provided in space 9 between the walls of bag 2. As a consequence, the portion A-B of the bag will bed down onto cover 12, and the portion B-C will conform to the contours of the package. The portion A-D of bag 2 will bed down onto the inside of bell 1. During this "inflation" of the bag, valve 15 should naturally be open.

It will be clear that many constructive solutions are possible for mounting the cover and that the cover may have various shapes. One condition is of course that the shape of cover 12 and the "mouth" (open end) of the bag 2 should be adapted to each other so that when the bag is inflated a good seal is obtained.

The pressure is measured with gauge 16. For further details reference is made to European patent application No. 85.200.130.4, which, as far as relevant, is incorporated herein by reference.

The double bag can be made, for example, by immersing an aluminium mould of the required shape in a latex bath and vulcanizing the latex layer clinging to the aluminium after removing the mold from the bath. If the opening in the bottom of the outer wall of the bag is sufficiently large it will be possible, if desired, using the stretchability of the rubber, to remove the aluminium mould and replace it by a plastic frame 3. Naturally it is also possible to make the double bag by injection moulding between two moulds.

What I claim is:

1. A bag for use in leak testing vacuum packages having a predetermined shape, comprising:
    a rigid frame having (i) an open end, (ii) a shape generally comforming to the predetermined shape, and (iii) inside and outside surfaces;
    a flexible inner layer extending along the inside surface of the frame, having a shape generally conforming thereto, and forming (i) an open end adjacent the open end of the rigid frame, and (ii) an interior in communication with said open end of the inner layer to receive a vacuum package;
    a flexible outer layer extending along the outside surface of the frame and having a shape generally conforming thereto;

the inner and outer layers forming an internal space, and being connected to each other adjacent the open ends of the frame and the inner layer to close said internal space adjacent said open ends; and inlet means in communication with said internal space to conduct gas into the internal space to urge the inner and outer layers away from the frame, and to conduct gas out from the internal space to collapse the inner and outer layers onto the frame.

2. A bag according to claim 1, wherein the inlet means is connected to the frame and extends outward therefrom through the outer layer.

3. A bag according to claim 2, wherein:
the inner and outer layers are integrally connected together; and
the frame and the inlet means are integrally connected together.

4. A bag for use in leak testing vacuum packages having a predetermined shape, comprising:
a shell having flexible inner and outer layers connected together to form (i) an open end
(ii) an interior in communication with the open end to receive a vacuum package, and
(iii) a substantially enclosed internal space between the inner and outer layers;

a rigid frame held within said internal space, holding the shell in a shape generally conforming to the predetermined shape, and having an open end adjacent the open end of the shell; and inlet means in communication with said internal space to conduct gas into the internal space to urge the inner and outer layers away from the frame, and to conduct gas out from the internal space to collapse the inner and outer layers onto the frame.

5. A bag according to claim 4, wherein:
the inner and outer layers are integrally connected together; and
the inlet means is integrally connected to the frame and extends outward therefrom through the outer layer.

* * * * *